United States Patent [19]

Guy

[11] Patent Number: 5,783,071
[45] Date of Patent: Jul. 21, 1998

[54] APPARATUS FOR TREATING WASTEWATER

[75] Inventor: Monroe Wayne Guy, Baton Rouge, La.

[73] Assignee: Delta Environmental Products, Inc., Denham Springs, La.

[21] Appl. No.: 599,755

[22] Filed: Feb. 12, 1996

Related U.S. Application Data

[63] Continuation-in-part of Ser. No. 180,122, Jan. 11, 1994, Pat. No. 5,490,935.

[51] Int. Cl.$^6$ .................................................. C02F 3/30
[52] U.S. Cl. .................... 210/195.1; 210/199; 210/218; 210/256
[58] Field of Search ................... 210/195.3, 195.1, 210/199, 201, 202, 205, 218, 220, 256, 605, 903

[56] References Cited

U.S. PATENT DOCUMENTS

| | | | |
|---|---|---|---|
| 1,337,431 | 4/1920 | Berry | 210/320 |
| 1,381,615 | 11/1921 | Beeby | 210/320 |
| 2,383,302 | 8/1945 | Feinauer et al. | 210/320 |
| 2,901,114 | 4/1959 | Smith et al. | 210/202 |
| 3,057,796 | 10/1962 | Davis | 210/630 |
| 3,495,711 | 2/1970 | Englesson et al. | 210/195.3 |
| 3,796,321 | 3/1974 | Kosonen | 210/202 |
| 3,980,556 | 9/1976 | Besik | 210/6 |
| 3,994,802 | 11/1976 | Casey et al. | 210/5 |
| 4,054,524 | 10/1977 | Mackrle et al. | 210/195 |
| 4,650,577 | 3/1987 | Hansel | 210/195.3 |
| 5,104,542 | 4/1992 | Dixon et al. | 210/532.2 |

*Primary Examiner*—Thomas G. Wyse
*Attorney, Agent, or Firm*—Roy, Kiesel & Tucker

[57] ABSTRACT

An apparatus and method for treating wastewater is provided including a cylindrical tank having a top, a bottom, an outer wall and a cylindrical inner wall. The inner wall extends from the bottom of the tank to a point above a desired water level. The inner wall, the top and the bottom define an inner aerobic zone. The inner wall, the outer wall, the top and the bottom define an outer anaerobic zone. Wastewater may pass from the outer anaerobic zone to the inner aerobic zone through holes in the inner wall. An open ended conical hopper is positioned within the inner aerobic zone with its smaller end pointed toward the bottom of the tank. Several radially spaced air outlet pipes connected to a compressed air source extend downward into the inner aerobic zone where air is discharged through the open ends of the outlet pipes. An inlet line connected to the tank opens into the outer anaerobic zone of the tank. An outlet line is positioned within the clarification zone to remove purified water from the tank. Wastewater is treated by anaerobic bacteria in the outer anaerobic zone and by aerobic bacteria in the inner aerobic zone. Aerobic bacteria, forced through holes in the inner wall by aeration occurring in the inner aerobic zone, denitrify the wastewater as they are starved of oxygen in the outer anaerobic zone. Finally, suspended solids settle out of solution in the clarification zone prior to the purified water leaving the tank.

27 Claims, 3 Drawing Sheets

APPARATUS FOR TREATING WASTEWATER

CROSS-REFERENCE TO RELATED APPLICATION

This is a continuation-in-part of U.S. patent application Ser. No. 08/180,122 filed on Jan. 11, 1994, now U.S. Pat. No. 5,490,935.

BACKGROUND OF THE INVENTION

1. Field of the Invention

This invention relates generally to apparatus and methods for treatment of wastewater and, more particularly, to apparatus and methods for aerobic and anaerobic treatment of wastewater in a single tank employing an inverted cone clarifier.

2. Prior Art

Relatively small, self-contained wastewater treatment systems are being employed throughout the country for treatment of wastewater from domestic sources, particularly single family dwellings located in areas which are not served by larger municipal collection and treatment systems. Many different designs for those systems are used.

One treatment system design employs a single cylindrical tank having an inverted cone clarifier positioned within the tank with four radially spaced air pipes delivering air into the tank outside of the clarifier, as illustrated in U.S. Pat. No. 4,650,577, invented by Mr. Bradley L. Hansel (hereafter referred to as the "inverted cone system"). The geometry of the inverted cone system has proven to be a cost efficient and effective way to treat domestic sewage. It and other similar systems have focused, not on mixing, but on raising the dissolved oxygen content of the wastewater within the tank, thus providing additional support for the aerobic bacteria which feed on the wastewater. An example of such an attempt can be seen in U.S. Pat. No. 5,221,470, invented by Mr. Jerry L. McKinney. In this system, two air pipes deliver air to the lower portion of the tank and terminate at diffusers, which produce fine bubbles to maximize oxygen transfer to the wastewater.

The prior art does not contain an inverted cone treatment system that is capable of providing aerobic and anaerobic treatment and of removing nitrogen in a single apparatus. Therefore, what is desired is a system that retains the basic geometry of the inverted cone system and is capable of providing aerobic and anaerobic treatment of wastewater as well as denitrifying the same.

OBJECTS OF THE INVENTION

It is an object of this invention to provide increased treatment efficiency in an inverted cone wastewater treatment system.

It is another object of this invention to provide increased treatment efficiency in an inverted cone system without the addition of one or more filters to the system.

It is yet another object of this invention to provide anaerobic and aerobic treatment of wastewater and to denitrify the same in a single treatment system.

It is yet another object of this invention to provide anaerobic and aerobic treatment of wastewater and to denitrify the same while minimizing the cost and space increases usually associated with treating wastewater in multiple stages.

SUMMARY OF THE INVENTION

An apparatus and method for treating wastewater are provided including a tank comprised of an outer wall, a cylindrical inner wall, a top and a bottom. The inner wall and the outer wall will create two distinct regions within the tank. The region inside the inner wall is the inner aerobic zone, and the region between the inner wall and the outer wall is the outer anaerobic zone. The outer anaerobic zone and the inner aerobic zone are connected through one of several connecting means, including having one or more holes in the inner wall or raising the inner wall off the bottom of the tank or both.

Located within the inner aerobic zone is an open ended conical hopper. The small end of the cone faces the bottom of the tank and the large end faces the top. The hopper is positioned in the tank so that there is space between the open small end of the hopper and the bottom of the tank. The region inside the hopper is the clarification zone.

Several pipes extend into the inner aerobic zone in the space between the hopper and the inner wall. These pipes are connected to an air compressor which pumps air into the inner aerobic zone.

The dissolved oxygen content of the wastewater in the outer anaerobic zone is very low because there is no means of aeration in the outer anaerobic zone. This allows anaerobic bacteria to grow. These anaerobic bacteria consume some of the waste in the wastewater. While the wastewater is in the inner aerobic zone, the water is being stirred and churned by the air that is being pumped in through the air pipes. This causes the dissolved oxygen content to increase. The dissolved oxygen allows the growth of aerobic bacteria. These bacteria will also consume waste.

By using the churning water inside the inner aerobic zone to force water containing aerobic bacteria through the holes in the inner wall, nitrogen may be removed from the wastewater. Aerobic bacteria in the outer anaerobic zone will quickly consume any dissolved oxygen that may be present. When that dissolved oxygen is gone, the now oxygen starved aerobic bacteria will attack the nitrogen and oxygen containing waste to get to the oxygen. When this happens, the nitrogen will be released and will bubble out of the water as a gas.

In the calm water inside the hopper, any solid material that is still suspended in the water will either settle downward and fall out the open small end of the hopper and reenter the rest of the tank for further treatment or float to the surface of the hopper. After a short period, any remaining waste will have either fallen out or floated to the surface. Thus, the water in the central region of the hopper will be clean. By positioning the outlet line so that water enters it from the middle of the hopper, it may be ensured that only clean water leaves the tank.

Wastewater flows through the tank in the following manner. Wastewater enters the outer anaerobic zone through an inlet line. As the water level in the outer anaerobic zone rises relative to the level in the inner aerobic zone, wastewater will flow from the outer anaerobic zone through the holes in the inner wall into the inner aerobic zone until the levels are equal. As the water level in the inner aerobic zone outside the hopper rises relative to the water level inside the hopper, wastewater will flow into the hopper through the open small end of the hopper. An outlet line is located inside the hopper. It is positioned so that when the water inside the hopper reaches a certain level, the now purified water will run out the outlet line and leave the tank.

DETAILED DESCRIPTION OF PREFERRED EMBODIMENTS OF THE INVENTION

Figure 1:
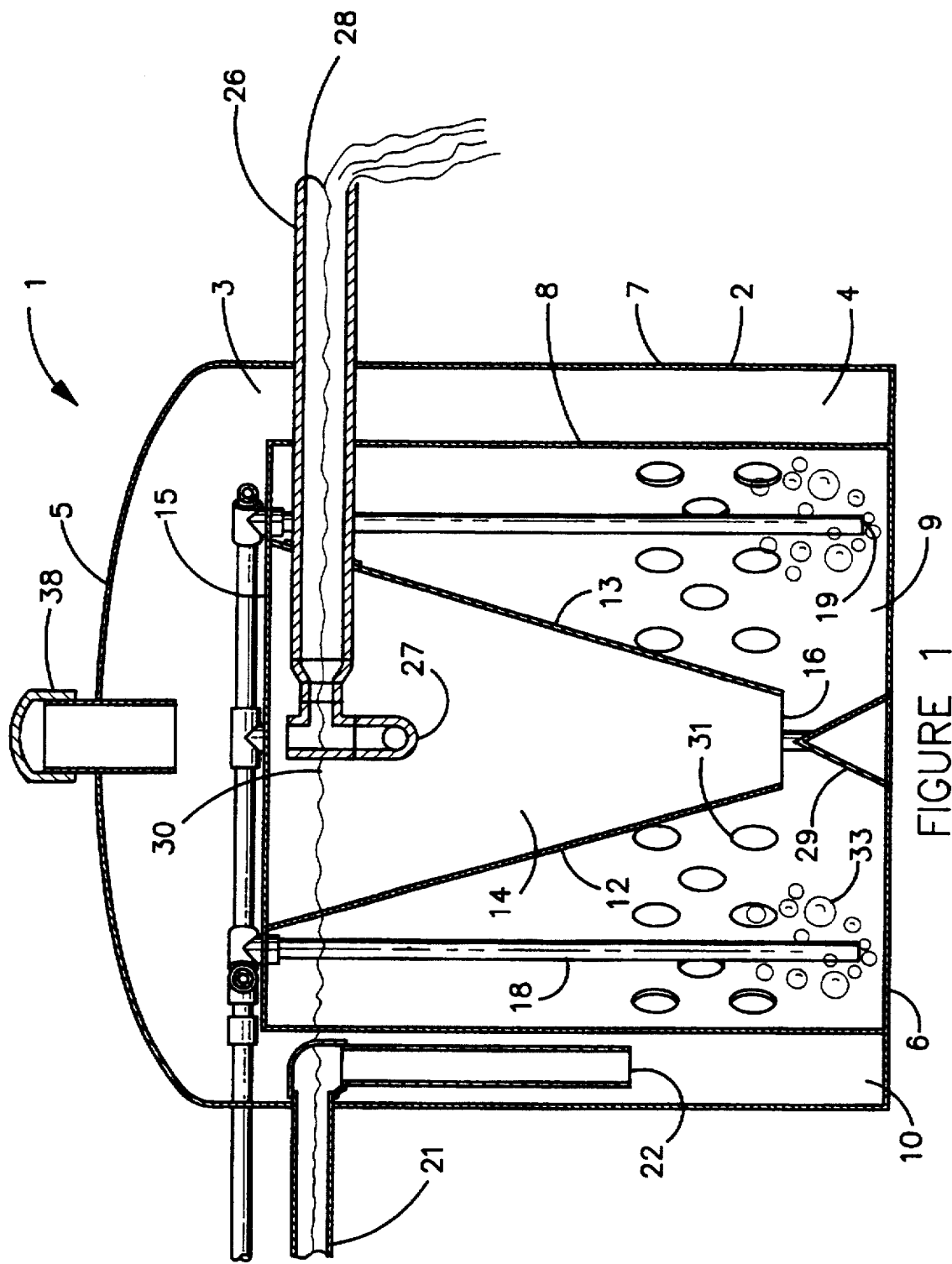
FIG. 1 is a cross sectional view of the anaerobic to aerobic embodiment of the invention depicting a plurality of holes in the inner wall as a connecting means.
Figure 2:
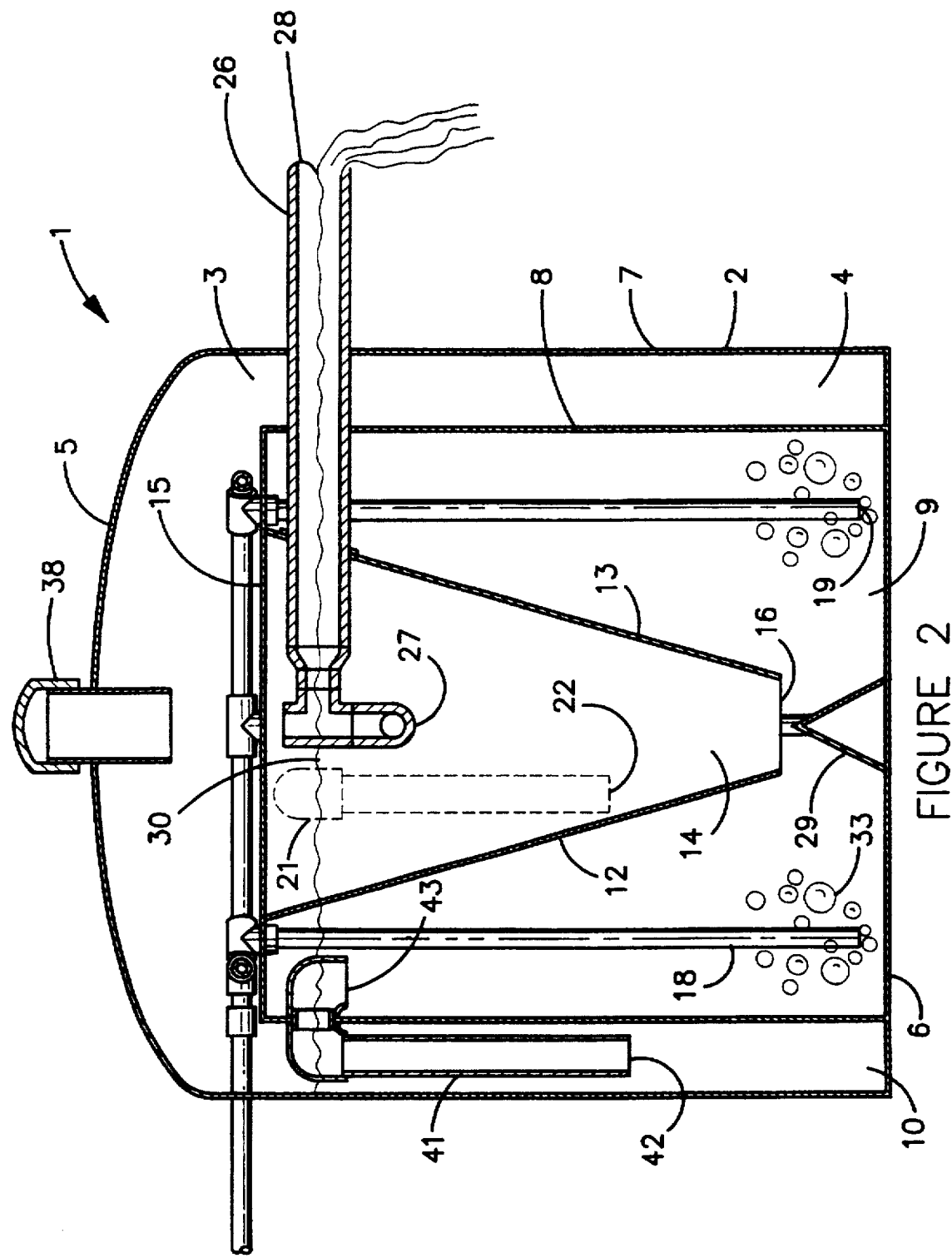
FIG. 2 is a cross sectional view of the anaerobic to aerobic embodiment of the invention depicting an inverted j-shaped pipe as the connecting means.
Figure 3:
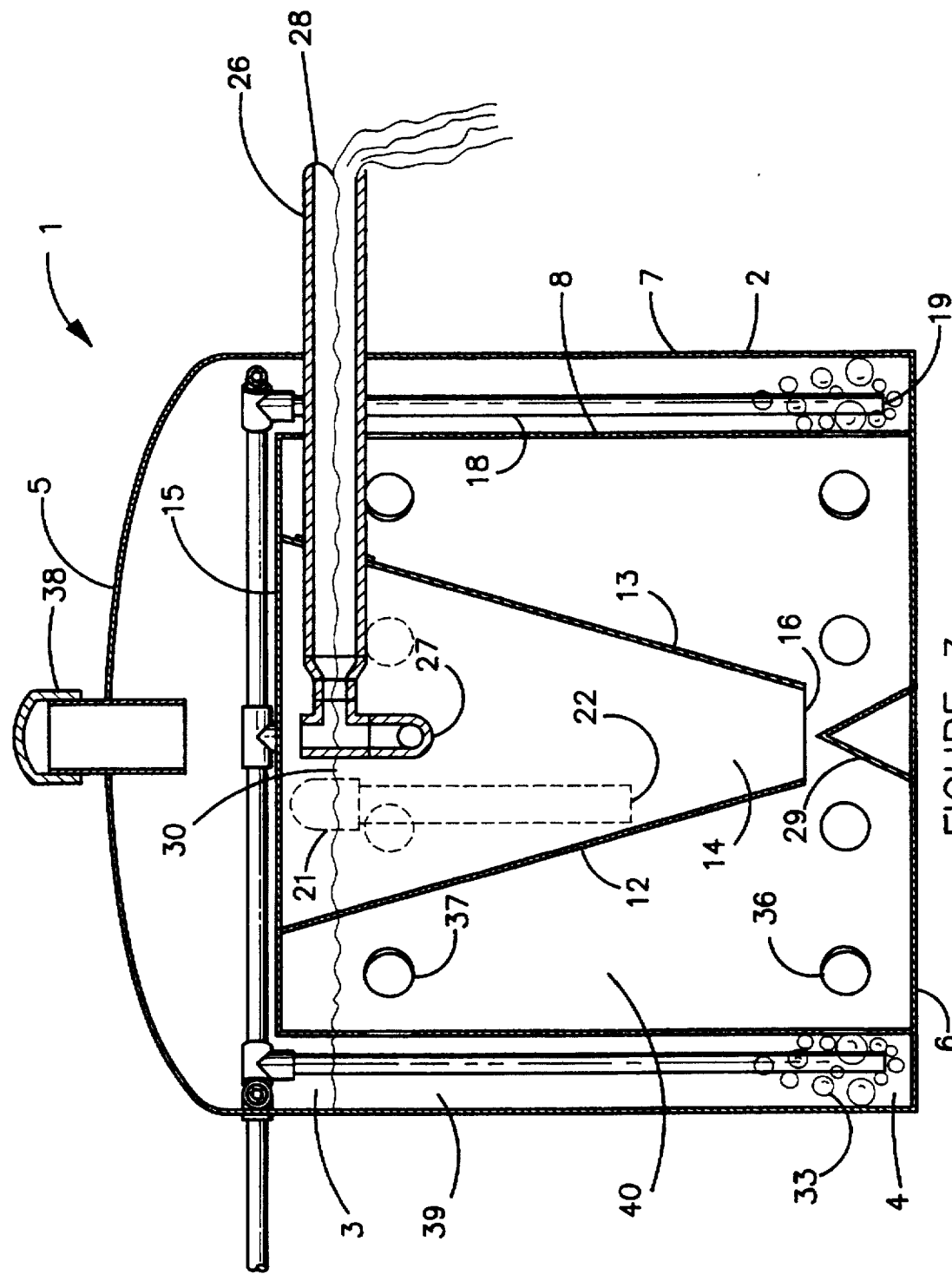
FIG. 3 is a cross sectional view of the aerobic to anaerobic embodiment of the invention depicting a plurality of paired vertically aligned openings in the inner wall as a connecting means.

As shown in the Figures, the treatment system 1 includes a tank 2, a top 5, a bottom 6, an upper portion 3, a lower portion 4, an outer wall 7, and an inner wall 8. Outer wall 7, top 5, bottom 6, and inner wall 8 define an outer anaerobic zone 10. Inner wall 8, top 5 and bottom 6 define an inner aerobic zone 9. Inner aerobic zone 9 and outer anaerobic zone 10 are connected by connecting means 11.

A hopper 12 having sides 13, an upper opening 15 and a lower opening 16 is located within inner aerobic zone 10. Upper opening 15 is located in upper portion 3 above a desired water level 30. Lower opening 16 is positioned in lower portion 4 above bottom 6. A deflector 29 may be placed on bottom 6 below lower opening 16. Hopper sides 13 are shown as continuous and conical, but they may include other shapes, such as a pyramidal shape. Hopper sides 13 define a clarification zone 14.

A compressed air source 17, such as an air compressor, is preferably located exterior to tank 2. Compressed air source 17 is fluidly connected to a plurality of radially spaced air outlet pipes 18. Air outlet pipes 18 extend from upper portion 3 into lower portion 4. Each air outlet pipe 18 has an open end 19 above bottom 6. All air outlet pipes 18 are located in inner aerobic zone 9 between inner wall 8 and hopper sides 13. A vent 38 is provided in top 5 to prevent pressure from building up in tank 2.

In a preferred embodiment, air outlet pipes 18 contains slots 32 which run up the side of air outlet pipes near open end 19. In a more preferred embodiment, slots 32 should be between one and eight inches long, and in another preferred embodiment, they should be approximately 4 inches long. The width of slots 32 should vary from between about 0.008 inches and about 0.125 inches. Preferably, there should be two such slots 32, one positioned on each side of air outlet pipe 18. The purpose of slots 32 is to allow uniform aeration in inner aerobic zone 10 even when treatment system 1 is not level. Of course, slots 32 may be used with or without open end 19.

In another variation, air outlet pipes 18 may be positioned between inner wall 8 and outer wall 7. In this case, outer wall 7, inner wall 8, top 5, and bottom 6 will define outer aerobic zone 39. Top 5, bottom 6, and inner wall 8 will define inner anaerobic zone 40. Unless otherwise noted, all following discussion is equally applicable to this variation, except that the order of treatment will be reversed. Specifically, aerobic treatment will precede anaerobic treatment.

Wastewater enters tank 2 through an inlet opening 20 contained in outer wall 7. Purified water exits tank 2 through a first outlet opening 23 contained in outer wall 7 and through a second outlet opening 24 contained in inner wall 8 and a third outlet opening 25 contained in hopper sides 13. First outlet opening 23 is positioned on outer wall 7 opposite from and lower than inlet opening 20. Second outlet opening 24 and third outlet opening 25 are linearly aligned with first outlet opening 23. Wastewater passes through inlet opening 20 via an inlet line 21. In operation, inlet line 21 has an inlet mouth 22 which discharges wastewater into outer anaerobic zone 10. Inlet mouth 22 may be adapted so that it opens below desired water level 30. Purified water passes through first outlet opening 23, second outlet opening 24 and third outlet opening 25 via outlet line 26. Outlet line 26 has an intake end 27 located within clarification zone 14. Intake end 27 is located below desired water level 30. Outlet line 26 has an outlet end 28 located external to tank 2.

From the foregoing, it should be apparent that in operation water travels through tank 2 starting in outer anaerobic zone 10. It then moves from outer anaerobic zone 10 to inner aerobic zone 9 via connecting means 11. Water in inner aerobic zone 9 enters clarification zone 14 via lower opening 16. Water in clarification zone 14 enters intake end 27 and exits tank 2 via outlet line 26. The only motive force behind the motion of water through tank 2 is gravity.

In one preferred embodiment, diffusion of air discharged from air outlet pipes 18 is discouraged by using open ends 19. Open ends 19 discharge coarse bubbles 33 which rise and displace large volumes of wastewater resulting in increased turbulence within inner aerobic zone 9 exclusive of clarification zone 14. Slots 32 may be used to provide some dispersement of air. However, the primary air flow should be through open ends 19. At least five radially spaced air outlet pipes 18 should be used, having a spacing of no greater than fifty inches, measured circumferentially along inner wall 8. In a preferred embodiment, wastewater should be continuously agitated by a substantially continuous flow of air through air outlet pipes 18 in the form of coarse bubbles 33 to substantially reduce any quiescent, or nonturbulent, zones in inner aerobic zone 9, exclusive of clarification zone 14.

It is believed that an additional benefit of the system 1 has been discovered. By using large bubble agitation as discussed above, dissolved oxygen levels within inner aerobic zone 9 are lower than previously thought permissible. However, a dramatic increase in treatment efficiency has been observed. It is believed that certain aerobic bacteria which thrive at lower dissolved oxygen levels, such as filamentous bacteria, are providing increased treatment efficiency.

Filamentous bacteria are normally thought to be undesirable due to their long tentacles, or filaments, which tend to cause the bacteria to create microscopic tangled masses. This causes the bacteria to have a large surface area relative to their mass. This large surface area causes them to take a long time to settle which can result in their being emitted with the effluent. However, this relatively large surface area also gives filamentous bacteria excellent filtration and treatment capabilities.

Filamentous bacteria require low dissolved levels (less than 1 to 2 mg/l) to prosper, but they must have some dissolved oxygen to exist. However, if the dissolved oxygen levels are too high, other faster growing bacteria will multiply more quickly than the filamentous bacteria and drive them out by consuming the lion's share of the dissolved oxygen. By using continuous large bubble aeration with an increased number of outlet pipes 18, as explained above, the dissolved oxygen content can be maintained at a level which allows the filamentous bacteria to thrive.

In order to encourage the growth of filamentous bacteria, it is preferred that the size of bubbles 33 be sufficiently large to maintain a maximum average dissolved oxygen level within inner aerobic zone 9 of less than two milligrams per liter of wastewater, when measured daily over a twenty-eight week period. As the temperature of the wastewater within the tank 2 decreases, the dissolved oxygen content rises. However, once the filamentous bacteria are established and maintained during the warmer months, they appear to survive the higher oxygen content of the colder months. Thus, it is also preferable that the size of bubbles 33 be sufficiently large to maintain a maximum average dissolved oxygen level within the inner aerobic zone 9 of less than one milligram per liter of wastewater, when measured daily during a thirty day period when the wastewater in tank 2 has an average daily temperature greater than fifteen degrees Centigrade.

The agitation caused by bubbles 33 is substantially confined to the portions of inner aerobic zone 9 exclusive of clarification zone 14. Thus the water in clarification zone 14 will be relatively free of turbulence. Because of this lack of turbulence, any suspended solids will settle out of suspension in clarification zone 14 and exit clarification zone 14 via lower opening 16. The lack of turbulence of clarification zone 14 as well as the relatively large surface area of clarification zone 14 also allows any filamentous bacteria that enter clarification zone 14 to settle out and exit via lower opening 16. This prevents suspended solids or filamentous bacteria from being emitted with the effluent from tank 2. For a discussion of the relative size of the surface area of clarification zone 14, see the discussion below relating to the preferred ratio of the flow rate of wastewater into tank 2 to the surface area of wastewater in clarification zone 14.

The aeration occurring within inner aerobic zone 9 has the advantage of allowing aerobic bacteria to provide valuable aerobic treatment of wastewater. However, it has the simultaneous disadvantage of preventing anaerobic bacteria from performing equally valuable anaerobic treatment of wastewater. Therefore, what is desired is a simple single unit that allows an aerobic treatment stage and an anaerobic treatment stage to occur in a home wastewater treatment unit. This is provided by locating outer anaerobic zone 10 outside inner aerobic zone 9. Because there is substantially no aeration in outer anaerobic zone 10, the dissolved oxygen levels in outer anaerobic zone 10 are negligible. The low dissolved oxygen levels in outer anaerobic zone 10 allow anaerobic bacteria to flourish there. This allows the wastewater to be treated anaerobically in the outer anaerobic zone 10 before it passes into the inner aerobic zone 9 for aerobic treatment. Inner wall 8 prevents air outlet pipes 18 from aerating outer anaerobic zone 10. Effective treatment is obtained when outer anaerobic zone 10 has a volume that is at least ten percent that of inner aerobic zone 9 and no more than equal to that of inner aerobic zone 9. Treatment is most effective when the volume of outer anaerobic zone 9 is about fifty percent that of inner aerobic zone 10.

Another advantage of the present invention is that outer anaerobic zone 10 acts as a filter of floating solids, preventing such floating solids from entering inner aerobic zone 9 and allowing anaerobic treatment of the solids until they cease floating. This makes the waste that enters the inner aerobic zone 9 more susceptible to attack by the bacteria there because the bacteria will be able to attack such solids from all sides, rather than from the bottom only. This is particularly beneficial because it separates undigested floating solids from outlet end 28 of outlet line 26, which serves to prevent the undesirable expulsion of incompletely treated floating solids from tank 2.

Flow between inner aerobic zone 9 and outer anaerobic zone 10 is accomplished through connecting means 11. In one preferred embodiment, connecting means 11 comprises at least one hollow inverted j-shaped pipe 41 having a first opening 42 and a second opening 43. First opening 42 is located in outer anaerobic zone 10 below desired water level 30. Second opening 43 is located in inner aerobic zone 9. Inverted j-shaped pipe 41 passes through inner wall 8 via inverted j-shaped pipe opening 44. The highest point in said inverted j-shaped pipe 41 must be below inlet opening 20. This embodiment accomplishes maximum separation of inner aerobic zone 9 and outer anaerobic zone 10. By placing first opening 42 below desired water level 30, floating solids may be excluded from the inner aerobic zone 9. By placing inverted j-shaped pipe opposite inlet opening 20, the length of time wastewater remains in outer anaerobic zone 10 is maximized which allows for the fullest anaerobic treatment.

Introduction of aerobic bacteria into outer anaerobic zone 10 may be desired for denitrification purposes. Aerobic bacteria in outer anaerobic zone 10 will consume any available dissolved oxygen, which has the added benefit of assuring that outer anaerobic zone 10 remains anaerobic. After any dissolved oxygen has been consumed, the aerobic bacteria will attack nitrogen bearing nutrients ($NO_x$) in the water in order to obtain the oxygen contained therein. This will result in free nitrogen ions being left in solution. These ions will combine to make $N_{2(g)}$ which will bubble out.

Introduction of aerobic bacteria into outer anaerobic zone 10 may be accomplished through connecting means 11. In one preferred embodiment, connecting means 11 comprises a plurality of holes 31 in inner wall 8, all of which are located below desired water level 30. In another preferred embodiment, connecting means 11 comprises inner wall 8 being raised from bottom 6. In yet another preferred embodiment, connecting means 11 comprises inner wall 8 being raised from bottom 6 and containing a plurality of holes 31, all of which are located below desired water level 30. In yet another preferred embodiment connecting means 11 comprises a plurality of paired apertures in inner wall 8, the first aperture 36 in each pair being located above inlet mouth 22 of inlet line 21 but below desired water level 30 and the second aperture 37 in each pair being located below inlet mouth 22 of inlet line 21 and in substantial vertical alignment with the corresponding first aperture 36. In all the embodiments listed above, the mixing action caused by air outlet pipes 18 will force water bearing aerobic bacteria through connecting means 11 into outer anaerobic zone 10 as desired. By varying the number, size and location of the openings of connecting means 11, the amount of aerobic bacteria introduced into outer anaerobic zone 10 may be controlled.

In a preferred embodiment, treatment system 1 is designed so that the quotient resulting from dividing the flow rate of wastewater into tank 2 by the surface area of wastewater in clarification zone 14 defined by sides 13 of hopper 12 does not exceed twenty-five gallons per day per square foot of surface area.

Flow Rate÷Surface Area<25 Gal/day/ft²

In another preferred embodiment, treatment system 1 is designed so that the quotient resulting from dividing the flow rate of wastewater into tank 2 by the surface area of wastewater in clarification zone 14 defined by sides 13 of hopper 12 is approximately 21.8 gallons per day per square foot of surface area.

Flow Rate÷Surface Area=21.8 Gal/day/ft²

There are, of course, alternate embodiments which are obvious from the foregoing description of the invention which are intended to be included within the scope of the invention as described by the following claims.

I claim:

1. An apparatus for treating wastewater for use with a compressed air source comprising:

a tank having an upper portion, a lower portion, a top, a bottom, an outer wall and a cylindrical inner wall, said inner wall extending from said lower portion into said upper portion above a desired water level, said inner wall, said top and said bottom defining an inner aerobic zone, said inner wall, said outer wall, said top and said bottom defining an outer anaerobic zone, said outer anaerobic zone having a volume of at least ten percent and no more than one hundred percent the volume of said inner aerobic zone;

a connecting means for connecting said outer anaerobic zone and said inner aerobic zone;

a hopper positioned within said inner aerobic zone, said hopper having sides defining a clarification zone, said hopper also having an upper opening located in said upper level above said desired water level, and a lower opening located in said lower portion below said desired water level, said hopper sides diverging outward from said lower opening to said upper opening, said lower opening being smaller than said upper opening;

a plurality of radially spaced air outlet pipes fluidly connected to said compressed air source, said air outlet pipes extending downward into said inner aerobic zone between said sides of said hopper and said inner wall, each said air outlet pipe containing an aperture, whereby air may be discharged into said inner aerobic zone;

a vent contained in said upper portion of said tank;

an inlet line connected to said tank having an inlet mouth opening into said outer anaerobic zone of said tank; and an outlet line having an intake end positioned within said clarification zone and an outlet end positioned external to said tank.

2. The apparatus of claim 1 wherein said outer anaerobic zone has a volume of about fifty percent the volume of said inner aerobic zone.

3. The apparatus of claim 1 wherein at least five said air outlet pipes are included, said air outlet pipes having a radial spacing of no greater than fifty inches measured circumferentially along said cylindrical inner wall.

4. The apparatus of claim 1 wherein said air outlet pipes and said compressed air source are adapted to continuously discharge air into said inner aerobic zone.

5. The apparatus of claim 1 wherein said air outlet pipes and said compressed air source are adapted to release a sufficient volume of air and sufficiently large bubbles such that wastewater is continuously agitated so as to substantially eliminate any quiescent zones within said inner aerobic zone exclusive of said clarification zone.

6. The apparatus of claim 1 wherein said air outlet pipes are adapted to release sufficiently large bubbles to maintain a maximum average dissolved oxygen level within said inner aerobic zone of less than two milligrams per liter of wastewater, measured daily over a twenty-eight week period.

7. The apparatus of claim 1 wherein said air outlet pipes are adapted to release sufficiently large bubbles to maintain a maximum average dissolved oxygen level within said inner aerobic zone of less than one milligram per liter of wastewater, measured daily over a thirty day period when the average daily temperature of wastewater in said tank is greater than fifteen degrees Centigrade.

8. The apparatus of claim 1 wherein said hopper and said tank are adapted such that the quotient resulting from dividing the flow rate of wastewater into said tank by the surface area of the wastewater in said hopper does not exceed 25 gallons per day per square foot of surface area.

9. The apparatus of claim 1 wherein said hopper and said tank are adapted such that the quotient resulting from dividing the flow rate of wastewater into said tank by the surface area of the wastewater in said hopper is about 21.8 gallons per day per square foot of surface area.

10. The apparatus of claim 1 wherein said connecting means further comprises at least one inverted j-shaped pipe, said pipe having a first opening and a second opening, said first opening being located in said outer anaerobic zone below said desired water level, said second opening being located in said inner aerobic zone, the highest point of said pipe being located below said inlet line.

11. The apparatus of claim 1 wherein said connecting means further comprises a plurality of holes in said inner wall.

12. The apparatus of claim 1 wherein said connecting means further comprises a plurality of paired apertures in said inner wall, each pair having a first aperture located below said desired water level but above said inlet mouth of said inlet line, each pair also having a second aperture located below said inlet mouth, and in substantial vertical alignment with said corresponding first aperture.

13. The apparatus of claim 1 wherein said connecting means further comprises said inner wall being raised from said bottom of said tank.

14. The apparatus of claim 13 wherein said inner wall contains a plurality of holes.

15. An apparatus for treating wastewater for use with a compressed air source comprising:

a tank having an upper portion, a lower portion, a top, a bottom, an outer wall and a cylindrical inner wall, said inner wall extending from said lower portion into said upper portion above a desired water level, said inner wall, said top and said bottom defining an inner anaerobic zone, said inner wall, said outer wall, said top and said bottom defining an outer aerobic zone;

a connecting means for connecting said outer aerobic zone and said inner anaerobic zone;

a hopper positioned within said inner anaerobic zone, said hopper having sides defining a clarification zone, said hopper also having an upper opening located in said upper level above said desired water level, and a lower opening located in said lower portion below said desired water level, said hopper sides diverging from said lower opening to said upper opening, said lower opening being smaller than said upper opening;

a plurality of radially spaced air outlet pipes fluidly connected to said compressed air source, said air outlet pipes extending downward into said outer aerobic zone between said outer wall and said inner wall, each said air outlet pipe containing an aperture, whereby air may be discharged into said outer aerobic zone;

a vent contained in said upper portion of said tank;

an inlet line connected to said tank having an inlet mouth opening into said outer aerobic zone of said tank;

an outlet line having an intake end positioned within said clarification zone and an outlet end positioned external to said tank.

16. The apparatus of claim 15 wherein said plurality of air outlet pipes have a radial spacing of no greater than fifty inches measured circumferentially along said cylindrical inner wall.

17. The apparatus of claim 15 wherein said air outlet pipes and said compressed air source are adapted to continuously discharge air into said outer aerobic zone.

18. The apparatus of claim 15 wherein said air outlet pipes and said compressed air source are adapted to release a sufficient volume of air and sufficiently large bubbles such that wastewater is continuously agitated so as to eliminate any quiescent zones within said outer aerobic zone.

19. The apparatus of claim 15 wherein said air outlet pipes are adapted to release sufficiently large bubbles to maintain a maximum average dissolved oxygen level within said outer aerobic zone of less than two milligrams per liter of wastewater, measured daily over a twenty-eight week period.

20. The apparatus of claim 15 wherein said air outlet pipes are adapted to release sufficiently large bubbles to maintain a maximum average dissolved oxygen level within said outer aerobic zone of less than one milligram per liter of wastewater, measured daily over a thirty day period when the average daily temperature of wastewater in said tank was greater than fifteen degrees Centigrade.

21. The apparatus of claim 15 wherein said hopper and said tank are adapted such that the quotient resulting from dividing the flow rate of wastewater into said tank by the surface area of the wastewater in said hopper does not exceed 25 gallons per day per square foot of surface area.

22. The apparatus of claim 15 wherein said hopper and said tank are adapted such that the quotient resulting from dividing the flow rate of wastewater into said tank by the surface area of the wastewater in said hopper is about 21.8 gallons per day per square foot of surface area.

23. The apparatus of claim 15 wherein said connecting means further comprises at least one inverted j-shaped pipe, said pipe having a first opening and a second opening, said first opening being located in said outer aerobic zone below said desired water level, said second opening being located in said inner anaerobic zone, the highest point of said pipe being located below said inlet line.

24. The apparatus of claim 15 wherein said connecting means further comprises a plurality of holes in said inner wall.

25. The apparatus of claim 15 wherein said connecting means further comprises a plurality of paired apertures in said inner wall, each pair having a first aperture located below said desired water level but above said inlet mouth of said inlet line, each pair also having a second aperture located below said inlet mouth, and in substantial vertical alignment with said corresponding first aperture.

26. The apparatus of claim 15 wherein said connecting means further comprises said inner wall being raised from said bottom of said tank.

27. The apparatus of claim 26 wherein said inner wall contains a plurality of holes.

* * * * *